US012031354B1

(12) United States Patent
Zastrow et al.

(10) Patent No.: US 12,031,354 B1
(45) Date of Patent: Jul. 9, 2024

(54) POWER-ACTIVATED CAM LOCK

(71) Applicants: Justin Zastrow, San Diego, CA (US); Ira Hayes, San Diego, CA (US); William Birgen, Tempe, AZ (US)

(72) Inventors: Justin Zastrow, San Diego, CA (US); Ira Hayes, San Diego, CA (US); William Birgen, Tempe, AZ (US)

( * ) Notice: Subject to any disclaimer, the term of this patent is extended or adjusted under 35 U.S.C. 154(b) by 339 days.

(21) Appl. No.: 17/335,445

(22) Filed: Jun. 1, 2021

Related U.S. Application Data

(63) Continuation of application No. 16/189,977, filed on Nov. 13, 2018, now Pat. No. 11,021,894.

(60) Provisional application No. 62/585,738, filed on Nov. 14, 2017.

(51) Int. Cl.
*E05B 47/00* (2006.01)
*E05B 47/06* (2006.01)

(52) U.S. Cl.
CPC ...... *E05B 47/0004* (2013.01); *E05B 47/0012* (2013.01); *E05B 47/0669* (2013.01); *E05B 2047/0058* (2013.01)

(58) Field of Classification Search
CPC ....... E05B 47/00; E05B 47/0001–0004; E05B 47/0012; E05B 47/0657; E05B 47/0661; E05B 47/0665; E05B 47/0669; E05B 47/0673; E05B 2047/0013; E05B 2047/0058
USPC .......... 70/277
See application file for complete search history.

(56) References Cited

U.S. PATENT DOCUMENTS

| | | | | |
|---|---|---|---|---|
| 2,044,622 A | | 6/1936 | Michauka | |
| 3,733,861 A | | 5/1973 | Lester | |
| 3,947,060 A | * | 3/1976 | Zimmer | E05B 47/0012 70/279.1 |
| 5,170,431 A | | 2/1992 | Dawson et al. | |
| 5,265,452 A | * | 11/1993 | Dawson | E05B 17/042 70/277 |
| 5,531,086 A | | 7/1996 | Bryant | |
| 5,626,039 A | * | 5/1997 | Solari | E05B 47/0012 70/279.1 |
| 5,693,987 A | * | 12/1997 | Krucoff | E05B 81/06 70/264 |
| 5,790,034 A | * | 8/1998 | Khoury | E05B 47/0012 292/144 |
| 5,931,430 A | | 8/1999 | Palmer | |

(Continued)

FOREIGN PATENT DOCUMENTS

| | | |
|---|---|---|
| EP | 2960409 | 12/2016 |
| WO | 2009151382 | 12/2009 |
| WO | 2015189391 | 12/2015 |

*Primary Examiner* — Nathan Cumar
(74) *Attorney, Agent, or Firm* — Venjuris, P.C.

(57) ABSTRACT

In general, the present invention is incorporated in a cam lock housing that is securable relative to a drawer or door. Coupled to the cam lock housing is an actuator package. The actuator package of this exemplary cam lock system can include a retractable geared plate or tongue, a micro gear motor, a controller, and a power system. In operation, the drive gear/pinion causes lateral displacement of tongue towards or away from a latch in order to lock or unlock the item. As such, a medicine cabinet (or similar), can be remotely locked or unlocked. Alternatively, rotation of a physical key within the cam lock rotates the cam lock housing and the tongue towards or away from a latch so that the cam lock can also be operated manually.

9 Claims, 11 Drawing Sheets

(56) References Cited

U.S. PATENT DOCUMENTS

| | | | | |
|---|---|---|---|---|
| 5,943,888 | A | 8/1999 | Lawson | |
| 6,112,563 | A * | 9/2000 | Ramos | G07C 9/00182 292/144 |
| 6,282,931 | B1 * | 9/2001 | Padiak | E05B 47/0012 292/201 |
| 6,318,138 | B1 | 11/2001 | Mathews | |
| 7,017,379 | B1 | 3/2006 | Hsieh | |
| 7,096,697 | B2 * | 8/2006 | Keightly | E05B 53/00 70/279.1 |
| 7,165,428 | B2 | 1/2007 | Isaacs et al. | |
| 7,240,524 | B1 * | 7/2007 | White | E05B 65/0021 70/279.1 |
| 7,647,797 | B1 | 1/2010 | Visa Cabrera | |
| 8,468,743 | B2 | 6/2013 | Ting et al. | |
| 8,833,118 | B1 * | 9/2014 | McLane | E05C 1/08 292/DIG. 60 |
| 9,702,168 | B2 | 7/2017 | Jadallah et al. | |
| 9,790,716 | B2 | 10/2017 | Hagemeyer et al. | |
| 2007/0257773 | A1 * | 11/2007 | Hill | E05B 47/0012 70/278.1 |
| 2008/0307837 | A1 * | 12/2008 | Greiner | E05B 47/0012 292/172 |
| 2009/0217718 | A1 | 9/2009 | Porter | |
| 2011/0084506 | A1 * | 4/2011 | Roatis | E05B 63/0052 292/201 |
| 2011/0225433 | A1 * | 9/2011 | Wan | E05B 47/026 712/E9.016 |
| 2013/0285393 | A1 * | 10/2013 | Roatis | E05B 47/0012 292/336.3 |
| 2016/0312504 | A1 | 10/2016 | Marsh | |
| 2016/0340943 | A1 | 11/2016 | Sharp | |
| 2017/0268258 | A1 | 9/2017 | Jadallah et al. | |

* cited by examiner

SECTION A-A

SECTION B-B

POWER-ACTIVATED CAM LOCK

FIELD OF INVENTION

This invention generally relates to mechanical fastening devices and more particularly pertains to cam lock systems, used in medical cabinets, showcases, file cabinets, tool chests, mailboxes, PO boxes, and so forth, for privacy and security reasons.

BACKGROUND

Traditional cam lock systems comprise a cam lock and a metal plate and are manually operated by turning a key. Most cam locks are cylindrical and configured to receive matching keys. When a key is inserted into a matching cam lock, the cam lock and the metal plate rotates with the key, generally ±90°, to engage or disengage with a catch or slot and lock or unlock the door, cabinets, drawers, or any items that the cam lock is attached to. If a user forgets to lock the door or cabinet, he/she has to physically be there to lock it or risk losing the security and/or privacy. Therefore, it is desirable to have a remotely-controllable, power-activated cam lock system working in parallel with a physical key lock system.

SUMMARY

The present invention is incorporated in a remotely-controllable, power-activated cam lock system. The system preferably comprises a cam lock, an actuator package coupled to the cam lock, a key, and a remote control. In an exemplary cam lock system, the cam lock is configured to receive and rotate with the key, preferably to a certain range of degrees, such as ±90°, or ±180°, when locking or unlocking. The actuator package of this exemplary cam lock system comprises a retractable geared plate or tongue, a micro gear motor, a controller, and a power system. The power system of this exemplary cam lock system is configured to provide electric power to the micro gear motor and the controller. In the exemplary cam lock system, the micro gear motor is configured to drive the plate back and forth, e.g. horizontally or vertically, radially/rotationally, or a combination thereof and the controller is configured to receive a control signal from the remote control to activate/deactivate the micro gear motor accordingly.

In operation, a user can lock a door by using the remote control of the exemplary cam lock system and unlock the door by either the remote control or manually with the key. To lock the door, a user uses the remote control to send a lock signal to the controller of the exemplary actuator package, and then the controller activates the micro gear motor to insert the plate into a catch or slot. To unlock the door, the user may use the remote control to send a unlock signal to the controller of the exemplary actuator package, and then the controller activates the micro gear motor to withdraw the plate from the catch or slot. Alternatively, the user may insert the key of the exemplary cam lock system into the cam lock and turn the whole exemplary cam lock system to a certain degree, such as 90°, to unlock the door. This way, if the power system of the exemplary cam lock system dies and the door is locked, i.e. the plate is inserted into the catch/slot, the user may still use the key to unlock and lock the door, just like with a traditional cam lock system.

The present invention utilizes a control/communication protocol with device(s) such as a home network hub, database, keypad, mobile phone, smart device, key fob, wearable, home integrated monitoring/control system, and portable wireless system. The communication protocol can implement any type of wireless devices including handheld scanners, cellphones, smartphones, tablets, key fobs, home monitoring/control interface units, etc. A communication protocol, such as Bluetooth, ISM (Industrial, Scientific, and Medical), ZigBee, Z-wave, Wifi, TinyMesh, or any other wireless communication protocol that can be utilized for data transference between the chosen device and this invention's wirelessly controlled compartment.

The transmitting and receiving of signals between the device and the compartment lock's controller/circuit board with firmware allows for unlocking or locking of aforementioned portable or stationary compartment(s). The remote device will send a secure command signal wireless to the lock controller (inside or outside of the compartment), which will in turn command the compartment lock to open. Sending the "open" command/signal can require a QR, proximity (0.1 to 30 feet), alphanumeric code, biometric entry or proximity based entry into the device in order to ensure security of the contents protected by the locked compartment.

In one configuration of this invention, the apparatus would lock its compartment automatically upon its closing. In other words, locking the compartment would not require a signal from the remote device. Only unlocking the compartment would require a signal from the remote device. Again, this is only one configuration of the invention. Requiring a signal from the device to unlock, open, close and lock the compartment is an equally viable configuration of this invention.

This invention creates the capability to secure items in a portable or stationary compartment. This invention is a lockable portable or stationary compartment that can contain features that can control the environment for the contents of said container.

Various embodiments may adopt various implementations or designs. The retractable plate of an alternate embodiment may work with a different type of motor, or mechanism, known in the art to drive the plate forward or backward, e.g. solenoid, stepper motor, thermal bimetallic actuator, piezoelectric actuator, heated gas piston actuator etc. Examples of the remote control may include a PC/cellphone APP that communicates with the controller of the exemplary actuator package by WIFI or Bluetooth signals, a simple device, like a garage door remote or a TV remote control, that communicates with the controller of the exemplary actuator package by radio or infrared signals, or any other suitable devices known in the art Additionally, the key of an embodiment and the matching cam can be any types of suitable "key-cam combinations," such as standard one-on-one keyed cam, a master-keyed cam, a keyless-slotted cam, a keyless-dial-combination cam, a combination-with-key-override cam, and so forth. Similarly, the cam lock of an embodiment can be of various shapes, including a knob cam, a T-handle cam, an L-handle cam, a wing-handle cam, and so on. Furthermore, an exemplary power system comprises three (3) AA batteries and a chamber housing the batteries.

It is an object of this invention to provide a remotely-controllable, power-activated cam lock system.

The features, functions, and advantages may be achieved independently in various embodiments of the disclosure or may be combined in yet other embodiments.

BRIEF DESCRIPTION OF THE DRAWINGS

Embodiments of the disclosure will become more fully understood from the detailed description and the accompanying drawings, wherein.

DETAILED DESCRIPTION

The figures illustrate exemplary embodiments of a power-activated cam lock incorporating aspects of the invention. The aspects of the invention disclosed may be may scaled or modified for any and all cam lock types. It is contemplated that one application of the disclosed embodiment is to create a smart cam lock that is capable of being operated by remote control, while retaining the ability to be actuated manually by a key. The cam lock embodiment described herein is preferably selected, designed, retrofitted, configured, or assembled to augment a typical, existing cam lock. Accordingly, the features of the disclosed embodiment should not be construed as limiting any aspect of the invention.

In general, the present invention is incorporated in a cam lock 100 that is securable relative to a drawer or door. Coupled to the cam lock wo is actuator package 200. The actuator package of this exemplary cam lock system preferably includes a retractable geared plate or tongue, a micro gear motor, a controller, and a power system.

The actuator package 200 uses mechanical motion to move the tongue 210 out of place while still allowing the key cam to work as normal. While linear motion is presently preferred other means of mechanical motion (e.g., rotational or transitive mechanical motion) can also work. The tongue 210 of the cam lock is the part that is latched down to hold the door closed, this method provides a way to transpose the tongue 210 out of place with mechanical motion to allow a door to be unlocked while still allowing the cam lock to function manually.

Figure 16:
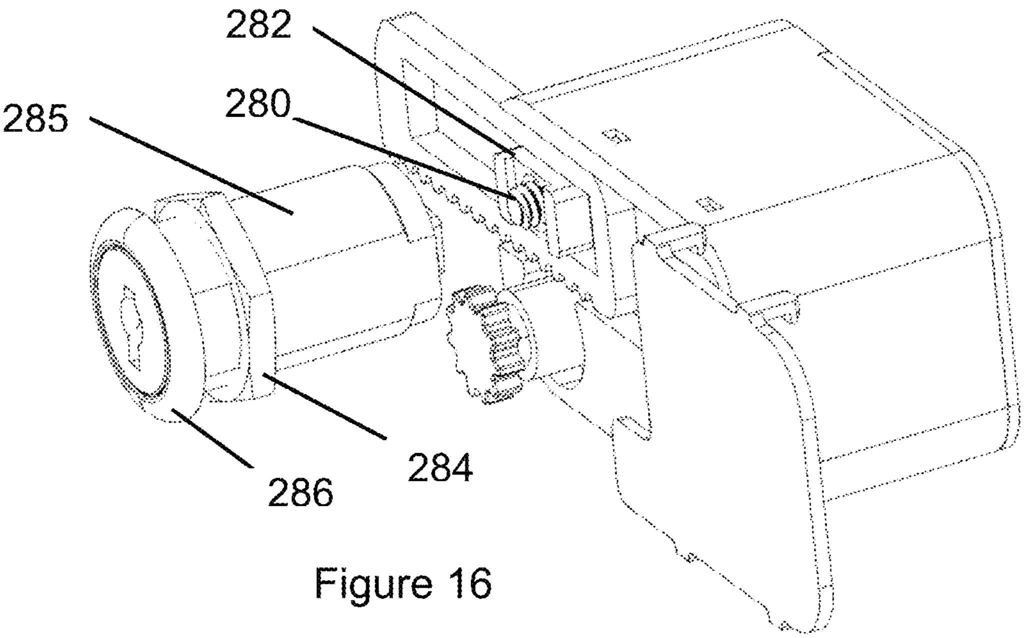
FIG. 16 illustrates one way to retrofit an existing cam lock to an actuator package.

Actuator package 200 preferably includes a circular drive gear 220 driven by a motor 230 and power source 242 within a drive gear housing 241, and an arm/catch (or "tongue") 210 having an outer linear gear edge 250 and a longitudinal interior aperture 260. The outer linear gear edge 250 interfaces with the drive gear 220 and operation of the drive gear causes the tongue 210 to move laterally relative to the cam lock 100. The longitudinal interior aperture 260 is dimensioned to receive a guide nut 282 as shown in FIG. 16. The cam lock wo can be existing hardware and the actuator package 200 can be retrofit hardware. Or, cam lock housing wo and actuator package 200 can be a single unit.

Figure 1:
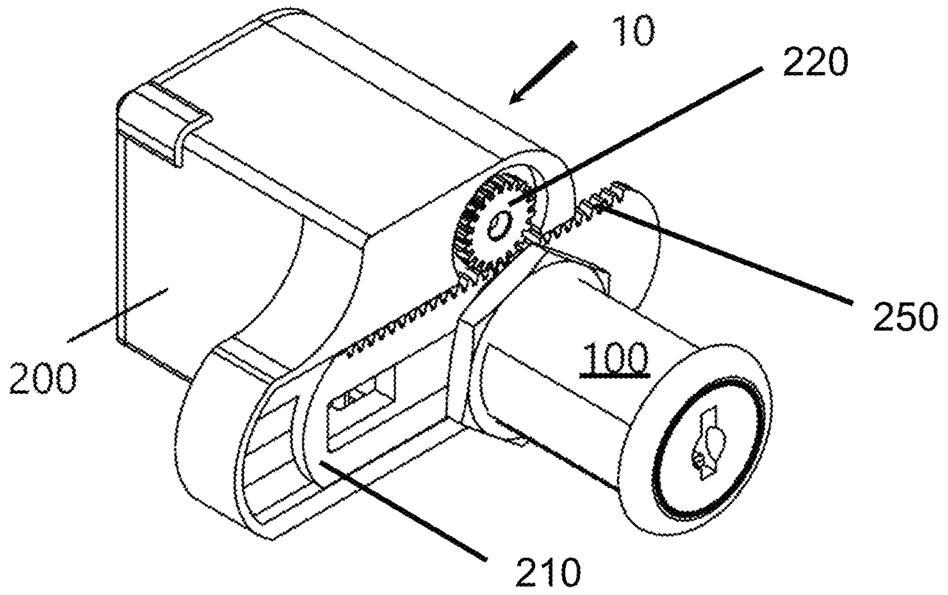
FIG. 1 is a perspective view of a preferred embodiment of the cam lock system.
Figure 2:
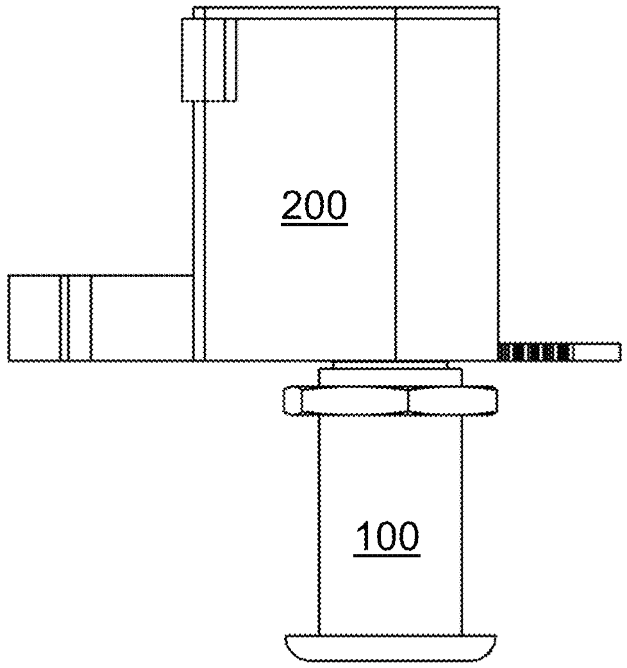
FIG. 2 is a top side view of the embodiment in FIG. 1.
Figure 3:
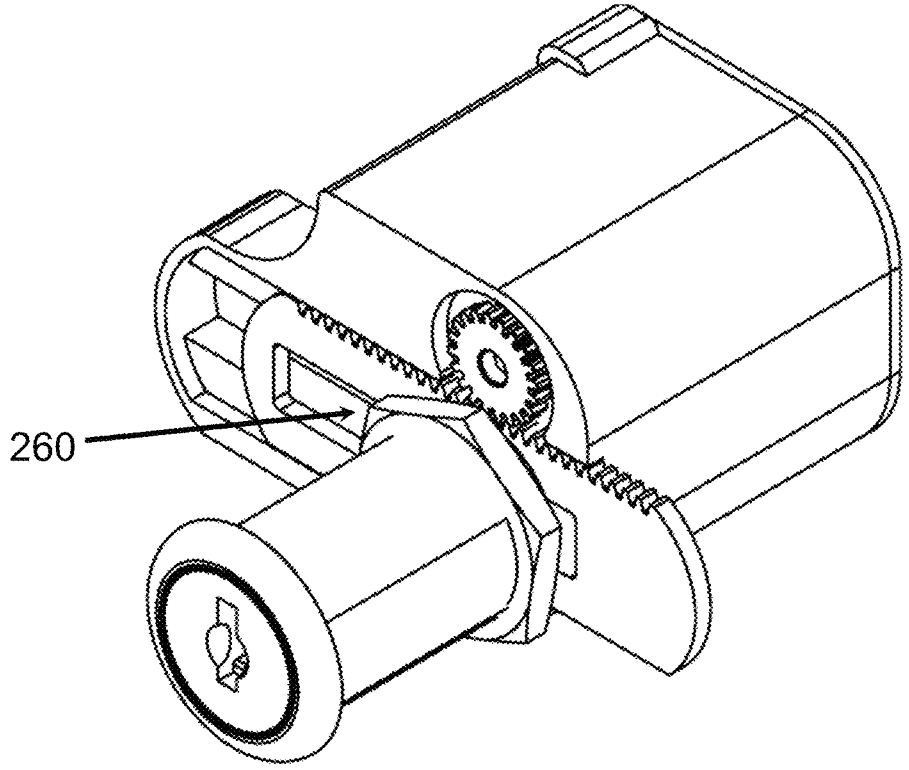
FIG. 3 is a second perspective view of the embodiment in FIG. 1.
Figure 4:
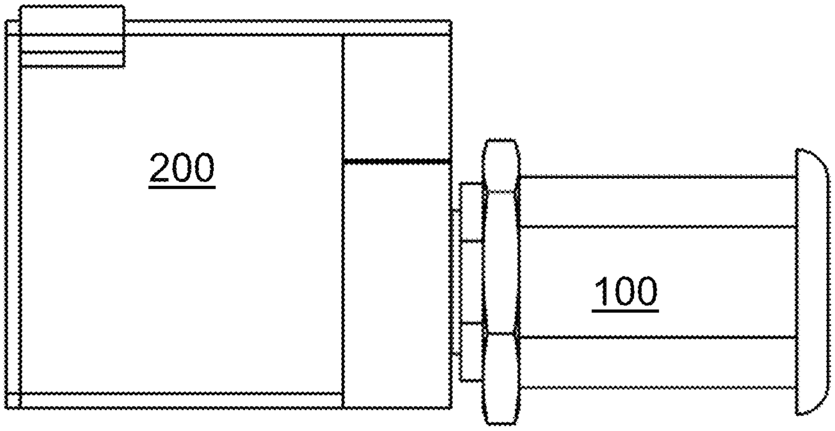
FIG. 4 is a left side view of the embodiment in FIG. 1.
Figure 5:
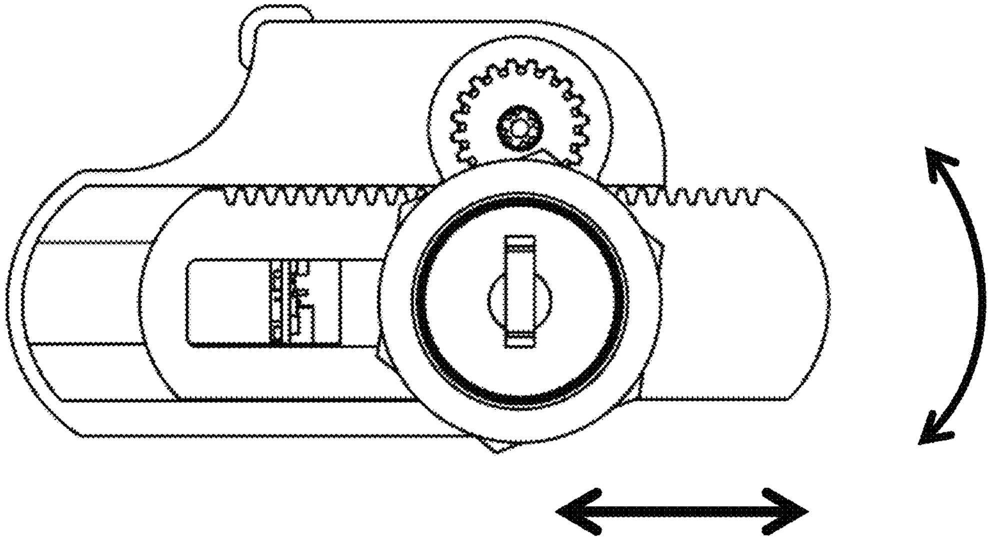
FIG. 5 is a front view of the embodiment in FIG. 1.
Figure 6:
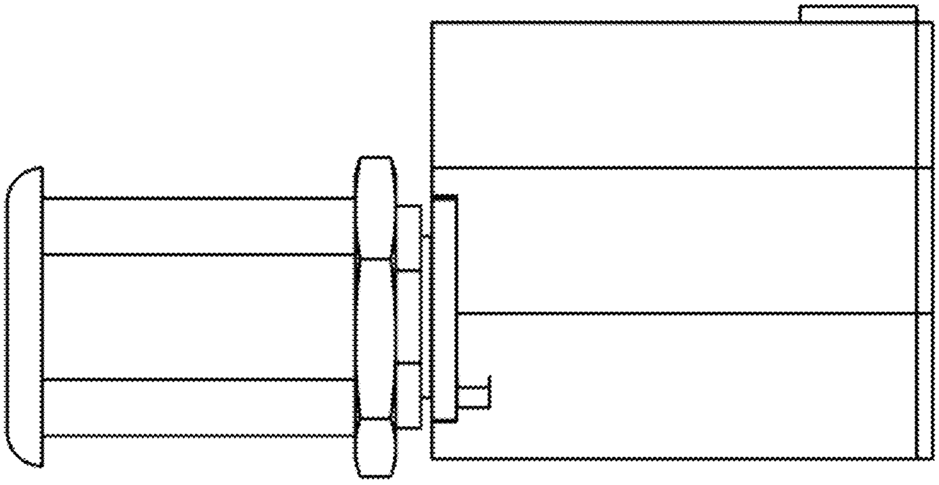
FIG. 6 is rear side view of the embodiment in FIG. 1.
Figure 7:
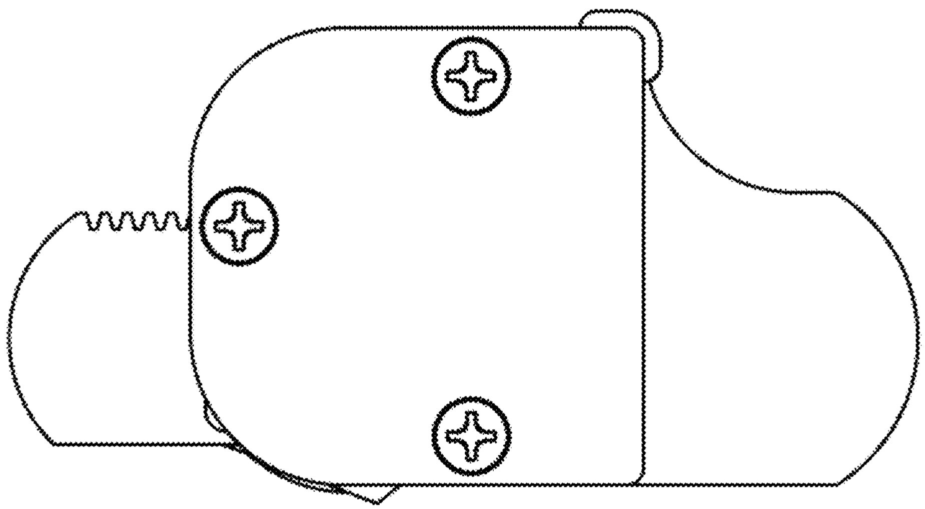
FIG. 7 is rear view of the embodiment in FIG. 1.
Figure 8:
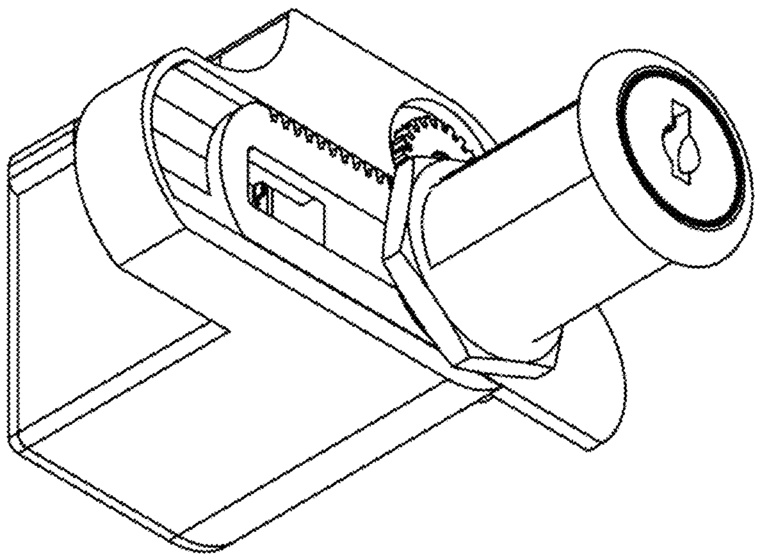
FIG. 8 is a third perspective view of the embodiment in FIG. 1.
Figure 9:
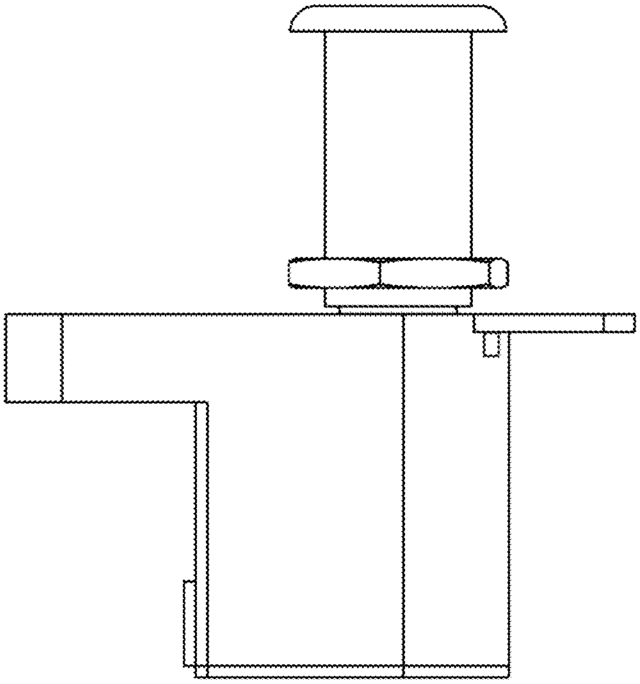
FIG. 9 is a top plan view the embodiment in FIG. 1.
Figure 10:
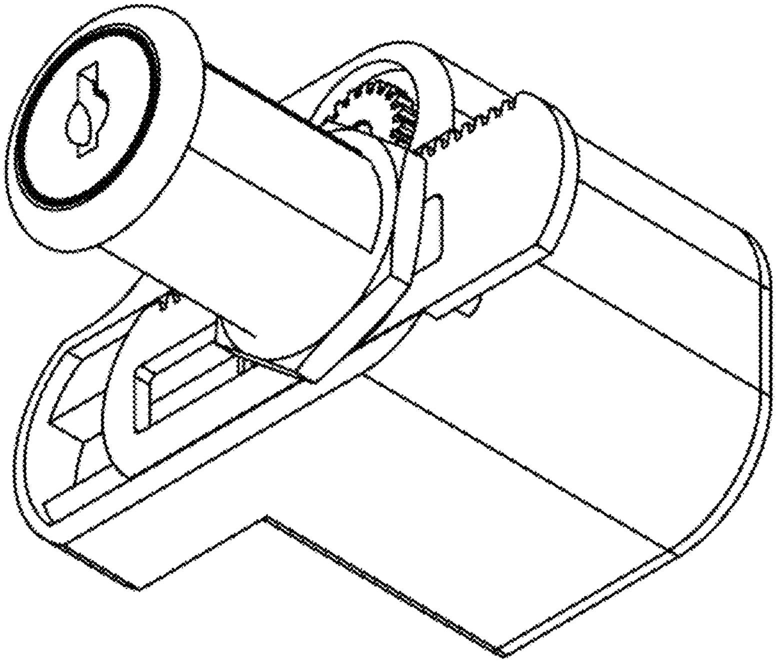
FIG. 10 a fourth perspective view of the embodiment in FIG. 1.
Figure 11:
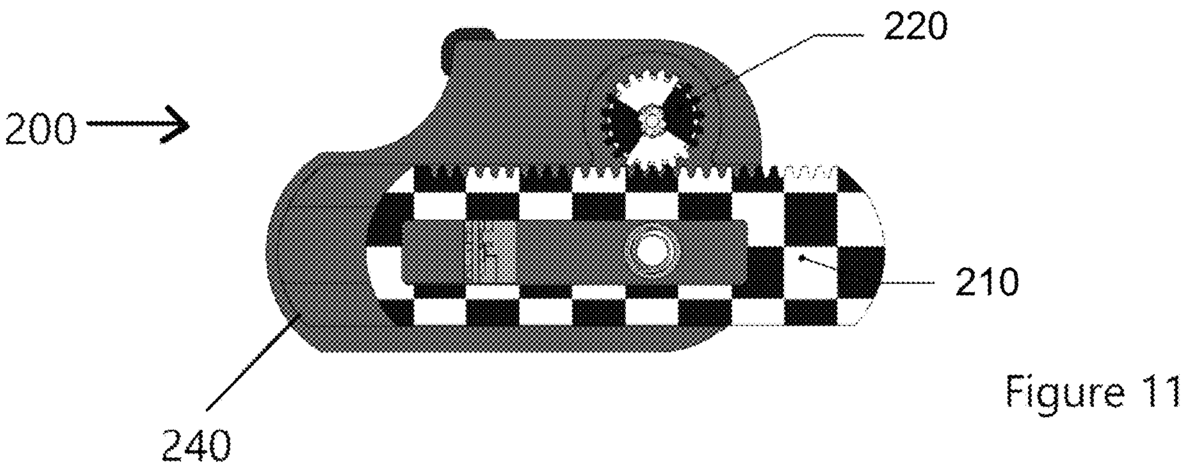
FIG. 11 is a front plan view of the embodiment in FIG. 1, with the cam lock removed.
Figure 12:
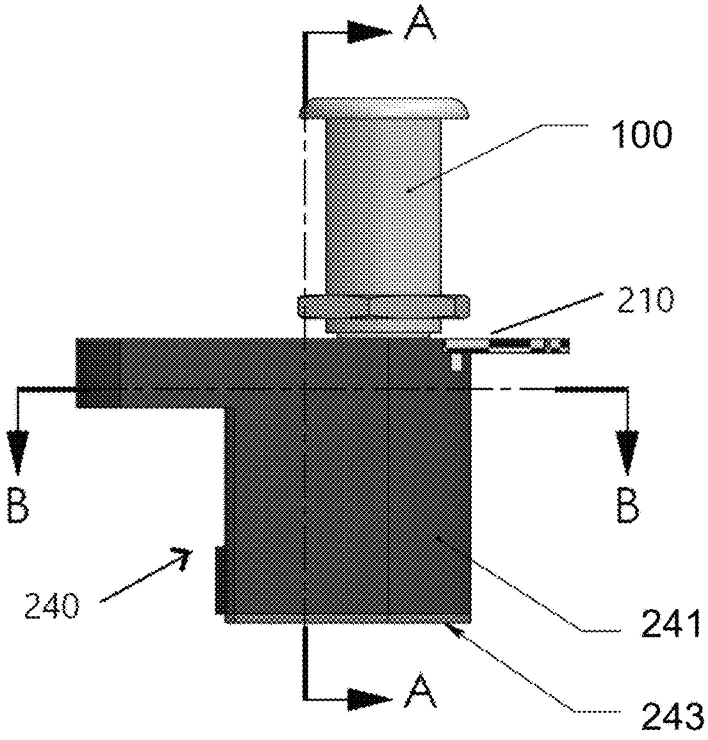
FIG. 12 is a top plan view of the embodiment in FIG. 1.
Figure 13:
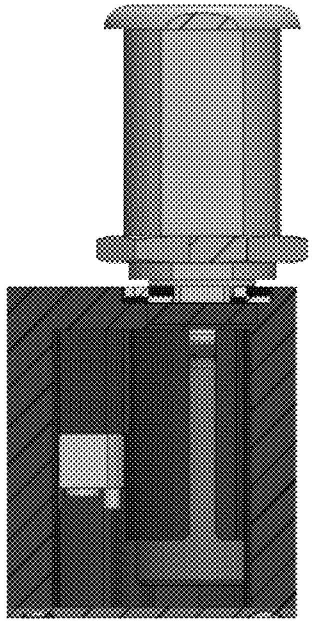
FIG. 13 is a cross sectional view, along A-A in FIG. 12, of the embodiment in FIG. 1.
Figure 14:
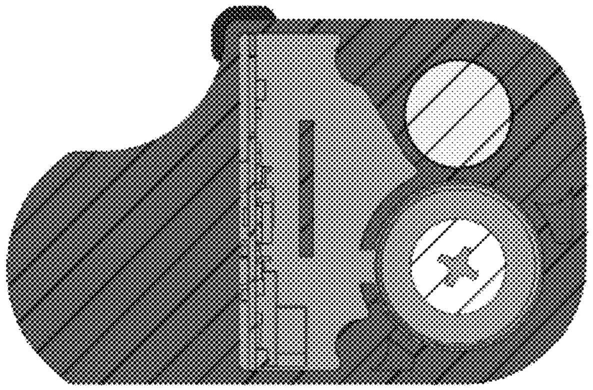
FIG. 14 is a cross sectional view, along B-B in FIG. 12, of the embodiment in FIG. 1.
Figure 15:
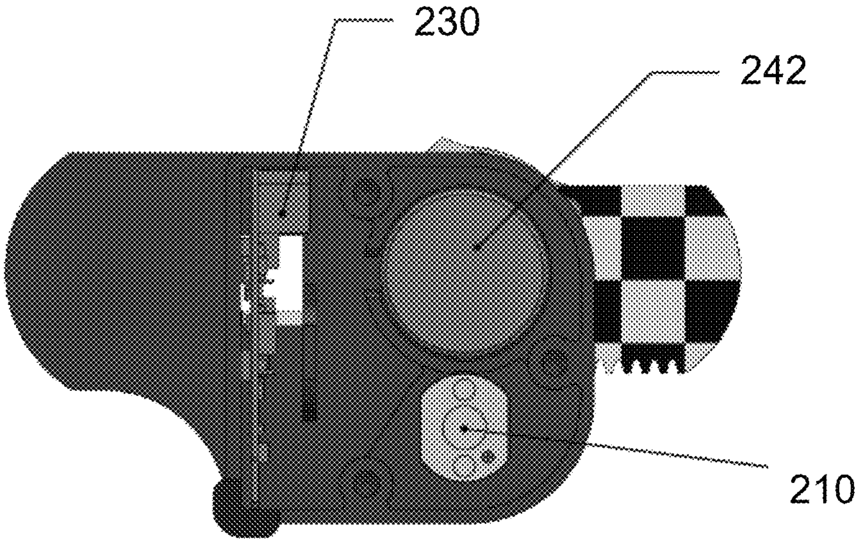
FIG. 15 is a rear view of the embodiment in FIG. 1, with the battery housing cover removed.

In operation, the drive gear/pinion 220 causes lateral displacement of tongue 210 towards or away from a latch in order to lock or unlock the item. As such, a medicine cabinet (or similar), can be remotely locked or unlocked. Alternatively, rotation of a physical key within the cam lock housing 285 rotates the cam cylinder 290, guide nut 282 and the tongue 210 towards or away from a latch so that the cam lock can be operated manually. It is preferred that the actuator package 200 rotate with the tongue 210. For example, the cam cylinder 290 can be configured to receive and rotate with the key, preferably to a certain range of degrees, such as ±90°, or ±180°, when locking or unlocking. In this way, and as shown in FIG. 5, the cam lock has at least two modes of operation: one, a linear extension and retraction of the tongue 210, and two, a rotation of the tongue 210.

FIGS. 1-19 illustrate a preferred embodiment of a remotely controllable cam lock system 10. The preferred embodiment 10 comprises a cam lock 100, a remotely controllable actuator package 200 coupled to the cam lock 100 with a fastener **28*o*, a key (not shown), and a remote control (not shown). The cam lock 100 of the preferred embodiment 10 is configured to receive and rotate with the key. The actuator package 200 of this preferred embodiment 10 comprises a retractable plate or tongue 210 with linear gear, a micro gear motor 230, a controller circuit PCBA 270, and a power system 240. The power system 240 of this exemplary cam lock system 10 includes a battery housing 241, one or more batteries 242, and a housing cover 243. In the exemplary cam lock system 10, the micro gear motor 230 is configured to drive the plate 210 horizontally, and the controller circuit 270 is configured to receive a control signal from the remote control and activate/deactivate the micro gear motor 23*o*** accordingly.

The power system of this exemplary cam lock system is configured to provide electric power to the micro gear motor and the controller. In the exemplary cam lock system, the micro gear motor 230 is configured to drive the plate back and forth, e.g. horizontally or vertically, and the controller 270 is configured to receive a control signal from the remote control and activate/deactivate the micro gear motor 230 accordingly.

The preferred embodiment includes a self-contained power supply to power the container and accessories. This power supply can be charged through wired in, wireless, or natural power source. This power supply can be charged through a wall plug, solar panel, or wireless charging system. Likewise, the charging system can be coupled to recharge the battery. This can be supplied from a main power source from the electrical grid (wall plug) or a secondary source, solar panel or wireless charger.

The lock can be activated by one or a combination of electronic signals or manual activation, these activations can be wireless, biometric, key or code based. In addition to the locking system shown the drawings, there can also be a secondary lock added for overlock protection that can be a conventional lock, or electronic lock.

There are many ways the controller circuit 270 can receive a remote signal. A cam lock with integrated radio (e.g. Bluetooth®) to communicate with phone application for locking and unlocking the cam lock is one way. Other examples of the remote control include a PC/cellphone application that communicates with the controller of the exemplary actuator package by WIFI or Bluetooth signals. Or it could be a simple device, like a garage door remote or a TV remote control, that communicates with the controller of the exemplary actuator package by radio or infrared signals, or any other suitable devices known in the art. The lock-unlock command can be sent wirelessly from various remote devices including battery-less bluetooth key fobs.

Figure 20:
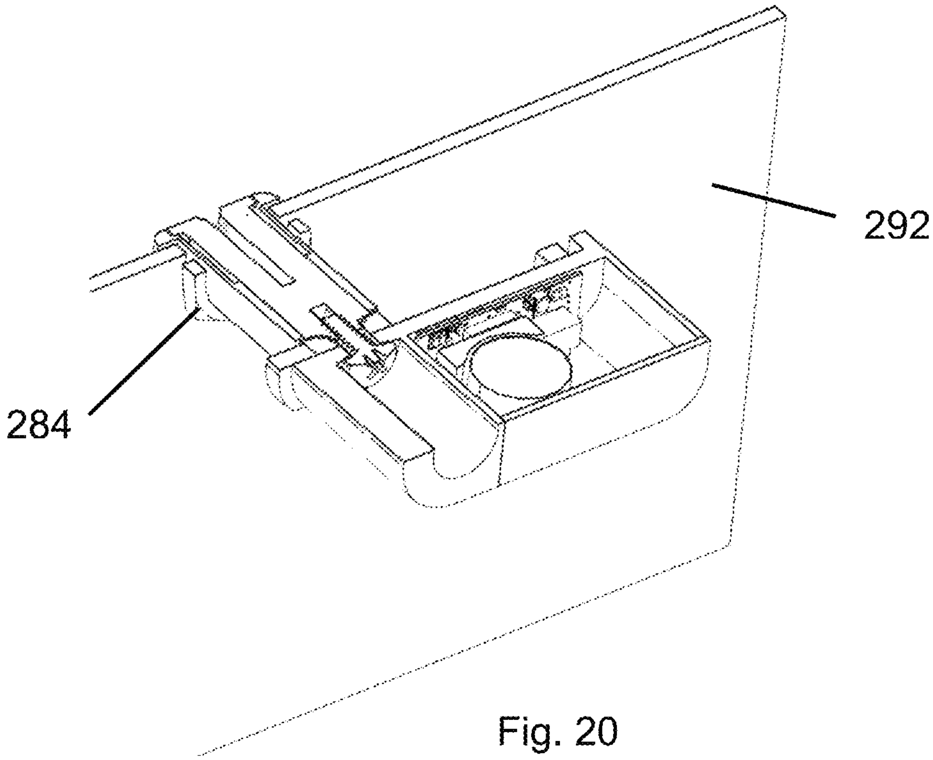
FIG. 20 illustrates a cut view of embodiment of a power-activated cam lock mounted to a cabinet door.

Referring to FIGS. 16-19, the cam lock is secured in place with a bulkhead type fitting. As shown, the bulkhead fitting typically comprises a fastener 280 (such as a king bolt), a guide nut 282, a bulkhead nut 284, a bulkhead flange 286, and a cam cylinder 290. This fitting locks the cam lock in place by sandwiching the door 292 material between the bulkhead flange 286 and the bulkhead nut 284. Example illustrations are provided in FIGS. 19 and 20.

Figure 17:
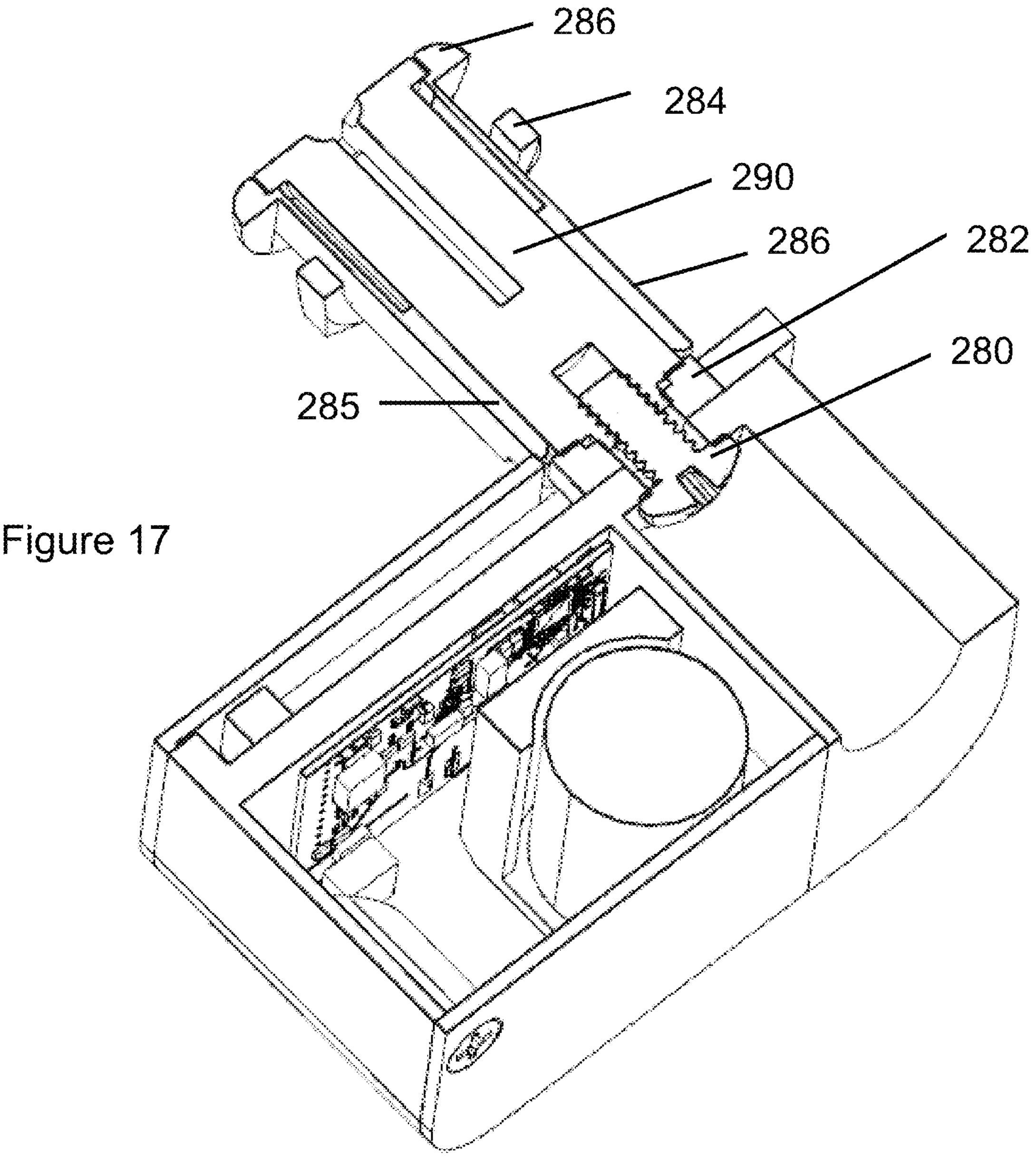
FIG. 17 illustrates a cut view of FIG. 16, illustrating an embodiment of a connection between the cam lock housing and the actuator package using a king screw.
Figure 18:
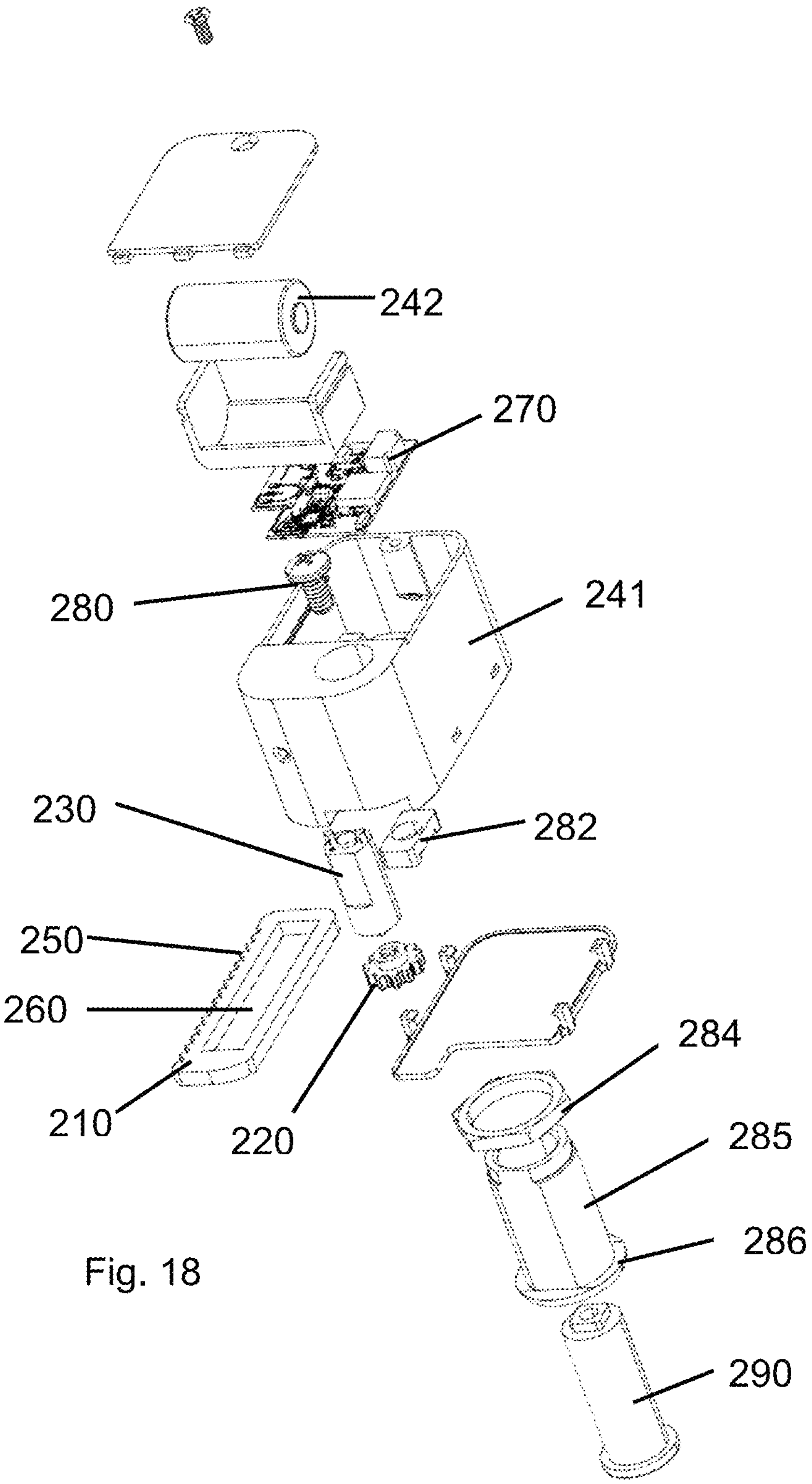
FIG. 18 is an exploded view of an exemplary embodiment of a power-activated cam lock.
Figure 19:
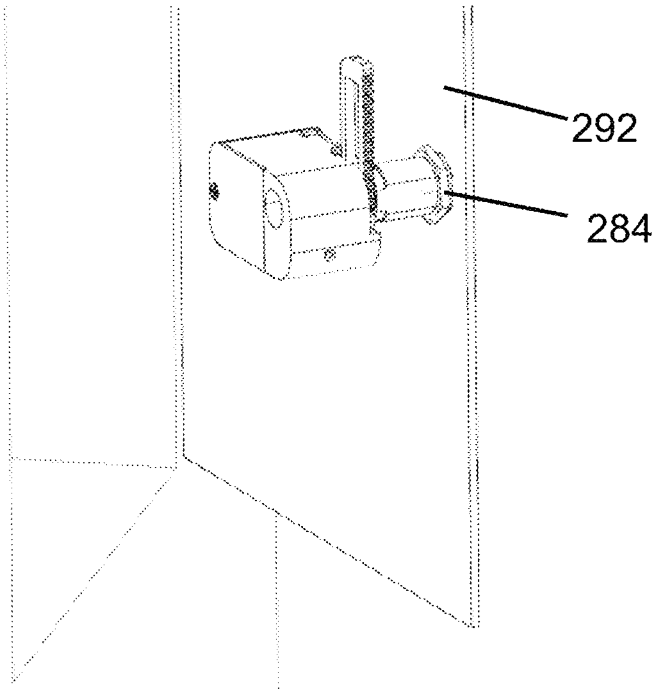
FIG. 19 illustrates an embodiment of a power-activated cam lock mounted to a cabinet door.

In a retrofit situation, an existing cam lock can be modified to accept the actuator package 200. The actuator package 200 can simply replace the regular (i.e., existing) tongue of the existing cam lock. One way to accomplish this is to remove the cam lock fastener 280 (king bolt), removing the existing cam lock tongue 210. Next, replace the existing cam lock tongue 210 with the actuator package 200 and use that same fastener 280 to connect the cam lock wo to the actuator package 200. An example of this connection is shown in FIGS. 16 and 17. In the figures, fastener 280 is inserted through the actuator package 200 using a guide nut 282 to allow lateral movement of the tongue 210. This fastener 280 secures the actuator package 200 to the existing cam lock wo so that no replacement of the original cam lock is needed.

In operation, a user can lock and unlock a door by using the remote control of the exemplary cam lock system or a manual key. To lock the door, a user uses the remote control to send a lock signal to the controller 270 of the exemplary actuator package 200, and then the controller activates the micro gear motor **23*o* to extend the plate 210 into a catch or slot. To unlock the door, the user may use the remote control to send an unlock signal to the controller 270 of the exemplary actuator package 200, and then the controller activates the micro gear motor 230 to withdraw the plate 210 from the catch or slot. Alternatively, the user may insert the key of the exemplary cam lock system into the cam lock 100 and turn the cam cylinder 290, which preferably turns the whole actuator package 200 via guide nut 282** to a certain degree, such as 90°, to unlock the door. This way, if the power system of the exemplary cam lock system dies and the door is locked, i.e. the plate is inserted into the catch/slot, the user may still use the key to unlock and lock the door, just like with a traditional cam lock system.

The preferred actuator package 200 has a controller 270 which interfaces with a software application installed on a remote device. An authorized individual, not necessarily the remote device user, may access this database to see when and where the lock was opened/closed/locked/unlocked. This invention could be used in a lock box, which may only be opened when the courier, equipped with the locking compartment, has the recipient enter the correct code, biometric or otherwise. The GPS location of the device along with the time would be uploaded to an internet accessible database, where it could be monitored by a supervisor or concerned party.

In yet another embodiment, a wireless and battery-free key fob or tag could be included on or in packaging to activate the lock. This could be advantageous in package delivery situation. A wireless sensor in the actuator package 200 could be configured to sense when a package having the key fob is close and allow for unlocking and locking events to be triggered. Alternatively, the wireless key fob could also be recognized when it is inside a container using an actuator package 200. In this way, the key fob could update information stored in the actuator package 200 and transmit that information (such as "package delivered") remotely using wi-fi or other communication protocol previously described.

Wireless Signal Protocol

Many communication protocols are already in existence and any of these may be used provided the device and the locking compartment share this protocol. A short list of possible protocols includes WIFI, Bluetooth, ISM (Industrial, Scientific, and Medical), ZigBee, Z-wave, TinyMesh, NBIoT, NFC, etc. A typical software and firmware architecture is illustrated below using Bluetooth.

Device Interface with User (the App)

It is assumed that the remote control device has one or more of the following interfaces:

Screen

Keypad/Keyboard

Roller/tracking ball

Camera

Microphone

Speaker

Wireless transmitter/receiver capability or equivalent

For the purposes of this specification an "app" or application refers to a prepackaged software subroutine designed specifically for the said device's operating system. This app could interface with the user through voice, or a keypad combination on the device's touch screen. This interface could also receive status from the lock. Status may then be communicated to the user via the app. The device's speakers are utilized by the app to provide alerts. Audible alerts are presented for scheduled alarm notifications, loss of signal connection with the locking compartment and for low battery and dead battery notification.

Device Initial Pairing with Compartment Lock

Preventing a foreign or alien device from operating the compartment lock requires that an initial, one time pairing of the device to the lock's controller board be made. A code specific to the lock's controller must be entered into the device during this initial paring process.

Security Access

The use of the device to provide the unlocking signal allows for utilization of the devices integral hardware. Typical devices have a keyboard, a touch screen, speakers, microphones, and cameras. Typing a user defined alphanumeric code into the app's prompt using either the keyboard or touch pad or virtual keyboard will allow for opening of the compartment. Additionally, tracing a user defined pattern into the touch screen may also serve as the unlocking trigger.

Biometric Identification

Just as entering a code via a keyboard or tracing a pattern onto a touch screen may unlock the compartment, scanning the user's retina or a finger print, via a camera, or using voice recognition, may unlock in the case.

Power Management/Status Functions

The invention will be capable of providing the power level of the lock's battery via the device. If the battery is drained or disconnected, the device will alert the user that the lock's signal connection to the device is lost.

In the event power is lost while the mobile locking compartment is connected to the device, a lost connection alert/notification will be displayed by the app, visually via the device's screen and/or audibly via the device's speakers.

Proximity Functions

The ability for the device to locate the actuator package 200 (or "locking compartment") if they are separated is possible with various communication protocols. This would be a desired feature if the compartment was lost or stolen. Activating the "Lost" module of the app installed in the device, would display a directional indication and distance to the compartment on the device's screen.

The ability of the compartment to alert the user of its location would require a speaker, or vibrator module. The ability of the device to alert the user of the compartment's location would require using the device's existing speaker and screen. The distance (detected signal strength of compartment's Bluetooth board) and direction would be displayed on the screen of the device and would change/update as the location of the device moved in relation to the lost/stolen compartment. A speaker could accompany the directional guidance offered by the device's screen. Another invention feature is the ability of the device to alert the user when the signal connection with the compartment is lost.

Various embodiments may adopt various implementations or designs. The retractable plate of an alternate embodiment may work with a different type of motor known in the art to drive the plate forward or backward. Additionally, the key of an embodiment and the matching cam can be any types of suitable "key-cam combinations," such as standard one-on-one keyed cam, a master-keyed cam, a keyless-slotted cam, a keyless-dial-combination cam, a combination-with-key-override cam, and so forth. Similarly, the cam lock of an embodiment can be of various shapes, including a knob cam, a T-handle cam, an L-handle cam, a wing-handle cam, and so on. Furthermore, an exemplary power system comprises three (3) AA batteries and a chamber housing the batteries.

While embodiments of the disclosure have been described in terms of various specific embodiments, those skilled in the art will recognize that the embodiments of the disclosure may be practiced with modifications within the spirit and scope of the claims.

What is claimed is:

1. A method of retrofitting a cam lock comprising a first tongue and a cam lock fastener comprising:

removing the cam lock fastener, replacing the first tongue with an actuator package, the actuator package comprising a circular drive gear driven by a motor and power source, a second tongue having an outer linear gear edge and a longitudinal interior aperture, the outer linear gear edge interfaces with the drive gear and operation of the drive gear causing the second tongue to move laterally relative to a cam lock housing, and replacing the cam lock fastener.

2. The method of claim 1, wherein the actuator package further comprising a longitudinal interior aperture dimensioned to receive a guide nut, the guide nut and the longitudinal interior aperture configured so that the second tongue rotates about the guide nut when guide nut rotates.

3. The method of claim 1, wherein the circular drive gear is powered by a battery.

4. The method of claim 1, the actuator package further comprising an integrated system of software and hardware configured for unlocking by a remote paired device.

5. The method of claim 4 further comprising the step of sending a unique code to the lock.

6. The method of claim 4 further comprising the step of pairing a device with the actuator package.

7. The method of claim 4 further comprising the step of monitoring the status of the lock.

8. The method of claim 7 further comprising the step of linking to devices selected from the group consisting of mobile smart devices, routers, gateways, and hubs.

9. The method of claim 7 further comprising the step of accessing to smart home automation systems.

* * * * *